United States Patent
Jones et al.

(10) Patent No.: US 10,166,908 B2
(45) Date of Patent: Jan. 1, 2019

(54) VEHICULAR LAMP CLEANING SYSTEM

(71) Applicants: Roderick Jones, Fort St. John (CA);
Lawrence Gordon, Thunder Bay (CA)

(72) Inventors: Roderick Jones, For St. John (CA);
Lawrence Gordon, Thunder Bay (CA)

(*) Notice: Subject to any disclaimer, the term of this patent is extended or adjusted under 35 U.S.C. 154(b) by 360 days.

(21) Appl. No.: 15/077,048

(22) Filed: Mar. 22, 2016

(65) Prior Publication Data

US 2016/0297350 A1    Oct. 13, 2016

Related U.S. Application Data

(60) Provisional application No. 62/146,467, filed on Apr. 13, 2015.

(51) Int. Cl.
| | | |
|---|---|---|
| *B60Q 1/00* | (2006.01) | |
| *B60Q 1/44* | (2006.01) | |
| *B60S 1/54* | (2006.01) | |
| *B60S 1/60* | (2006.01) | |

(52) U.S. Cl.
CPC ......... *B60Q 1/0005* (2013.01); *B60Q 1/0088* (2013.01); *B60Q 1/44* (2013.01); *B60S 1/54* (2013.01); *B60S 1/603* (2013.01)

(58) Field of Classification Search
CPC ...... B60Q 1/0005; B60Q 1/0088; B60Q 1/44; B60Q 1/00; B60S 1/603; B60S 1/54
USPC ................. 15/250.001, 250.002, 250.01
See application file for complete search history.

(56) References Cited

U.S. PATENT DOCUMENTS

| | | |
|---|---|---|
| 3,117,727 A | 1/1964 | Pollock et al. |
| 3,469,088 A | 9/1969 | Coleman et al. |
| 3,915,385 A | 10/1975 | Hassinger et al. |
| 5,542,737 A | 8/1996 | Madden |
| 5,546,630 A | 8/1996 | Long |
| 5,657,929 A | 8/1997 | Dewitt et al. |
| 6,554,210 B2 | 4/2003 | Holt et al. |
| 7,140,740 B1 | 11/2006 | Cooper |
| 7,311,405 B2 | 12/2007 | Irvin |
| 8,087,122 B2 | 1/2012 | Martin |
| 2015/0114431 A1 | 4/2015 | Manning, Jr. |

FOREIGN PATENT DOCUMENTS

| | | |
|---|---|---|
| EP | 1483141 B1 | 7/2006 |
| WO | 2011079542 A1 | 7/2011 |

*Primary Examiner* — David Redding
(74) *Attorney, Agent, or Firm* — Miltons IP/p.i.

(57) ABSTRACT

A vehicular lamp cleaning system includes an isolation solenoid, an air reservoir and a discharge nozzle. The isolation solenoid is configured to be fluidly connected to the vehicular air tank of the vehicle. The air reservoir is configured to be fluidly connected to the isolation solenoid. The discharge nozzle is configured to be fluidly connected to the air reservoir. The discharge nozzle is also configured to (A) receive the pressurized air from the air reservoir, and (B) release and direct the pressurized air towards the exterior signal lamp of the vehicle. This is done in such a way that the pressurized air, which is released from the discharge nozzle, removes debris from the exterior signal lamp.

21 Claims, 3 Drawing Sheets

VEHICULAR LAMP CLEANING SYSTEM

TECHNICAL FIELD

This document relates to the technical field of (and is not limited to) a vehicular lamp cleaning system for a vehicle (and method therefor), and/or a vehicle including a vehicular lamp cleaning system.

BACKGROUND

Vehicles (such as, tractor trailers, etc.) have exterior signal lamps mounted thereto, in which the exterior signal lamps include, for instance, brake lamps, headlamps, taillights, running lamps, safety lamps, etc.

SUMMARY

It will be appreciated that there exists a need to mitigate (at least in part) at least one problem associated with existing vehicles having exterior signal lamps (and/or the operation thereof). After much study of the existing vehicles along with experimentation, an understanding of the problem and its solution has been identified and is articulated as follows:

From time to time, the exterior signal lamps of the existing vehicle become covered with unwanted debris (such as, mud). Keeping the exterior signal lamps (tail lamps, brake lamps, etc.) relatively clean from unwanted debris (thereby improving visibility of the existing vehicle to other motorists) represents a challenge. The existing vehicle, when travelling along a highway, creates an air vortex behind the existing vehicle. The air vortex causes unwanted debris (snow, rain, road dirt and/or mud depending on the conditions) to swirl behind the vehicle. This situation results in a progressive buildup of unwanted debris (also called, lamp-hampering material) around (and/or on top of) the exterior signal lamp until the luminosity of the exterior of the lamp (and subsequent visibility thereof) is severely hampered or completely obscured to other motorists. This unwanted condition is compounded with the newer types of LED (light emitting diode) exterior signal lamps that do not emit enough heat to melt snow, ice and/or sleet from the lamp surface in winter driving conditions. The current solution is for the driver of the existing vehicle to pull over continually and clean the exterior signal lamps by hand. Unfortunately, as soon as the existing vehicle resumes travel, the lamp-obscuring process (described above) starts again.

Serious issues may arise from the usage of the existing vehicle and/or operation thereof. For instance, a reliance on the driver to stop driving the existing vehicle and manually clean the exterior signal lamps (frequency of vehicle stoppage for cleaning the exterior signal lamps increases as weather and/or driving conditions deteriorate) may cause reduced productivity (less time for driving the vehicle) and/or increased operating cost (since the driver needs to repeatedly stop and clean exterior signal lamps in adverse weather), and/or may cause increased risk for the driver becoming inadvertently hit by other motorists. Moreover, there is a practical limit for the number of times the existing exterior signal lamps are cleaned in adverse weather (due to limited time to stop to make unscheduled clean-ups) resulting in increased risk for unwanted collisions. Additionally, the increased number of rear-end collisions (as a result of driving the existing vehicle with uncleaned exterior signal lamps) leads to unwanted damage to property and/or injury to persons. There is an increased liability for collisions and potentially higher vehicle insurance costs that may result. There is an increased number of non-compliance fines (traffic tickets) due to obscured exterior signal lamps, which leads to higher operating costs of the existing vehicle.

The existing technology (solution) provides systems that attempt to resolve these unwanted issues.

For instance, some existing solutions provide electrically operated air compressors configured to generate sufficient air volume or draw small amounts of air directly from the air system of the existing vehicle (for cleaning the exterior signal lamp). Electrical compressors may require an upgrade of the electrical system of the vehicle, which is costly, time consuming and impractical.

Some existing solutions may provide air directly from the air braking system of the existing vehicle (for cleaning the exterior signal lamps). Moreover, these solutions cannot remove enough volume of air (at any one time) to be effective in extreme weather conditions. The reason is simply because these systems may run the risk of interfering with the air-brake supply volume of the vehicle and/or may be rendered inactive during high-demand braking applications (by a pressure protection valve) especially on existing vehicles having antilock-braking systems. These systems may use relatively higher volumes of air in high-demand braking situations. These existing systems may also incorporate electric timers that do not guarantee that the exterior signal lamps are clear of obstruction for when the exterior signal lamps are needed (such as, during braking applications, etc.).

Some existing solutions utilize washer fluid or wiping arms for cleaning off (removing) the forward-facing headlamps. However, this is not a viable solution for rear-facing lamps because of the amount of buildup of unwanted debris caused by swirling air vortexes created behind the vehicle during vehicle movement.

Other existing solutions utilize air deflectors mounted at the rear of the truck or trailer (the vehicle). These systems are limited to a specific vehicle configuration, and may not be mountable on equipment trailers, flat decks, logging trailers, gravel trucks, trailers, etc.

Other existing solutions utilize air and fluid combinations, which require a fluid reservoir to be filled continually. Moreover, the solution is rendered ineffective once the fluid reservoir is empty.

To mitigate, at least in part, at least one problem associated with the existing technology, there is provided (in accordance with a major aspect) a vehicular lamp cleaning system for a vehicle.

To mitigate, at least in part, at least one problem associated with the existing technology, there is provided (in accordance with a major aspect) a method for operating a vehicular lamp cleaning system for a vehicle.

To mitigate, at least in part, at least one problem associated with the existing technology, there is provided (in accordance with a major aspect) a vehicle including a vehicular lamp cleaning system.

To mitigate, at least in part, at least one problem associated with the existing technology, there is provided (in accordance with a major aspect) a vehicular lamp cleaning system that is configured to remove, in use, accumulated debris from an exterior signal lamp of a vehicle having a vehicular stoplight circuit. The vehicle also has a vehicular air tank for an air-operated braking system configured to operate a vehicular brake system. The vehicular brake system is configured to brake the vehicle. The vehicular lamp cleaning system includes (and is not limited to) a synergistic combination of an isolation solenoid, an air reservoir and a discharge nozzle. The isolation solenoid is configured to be fluidly connected to the vehicular air tank of the vehicle in such a way that the isolation solenoid receives pressurized air from the vehicular air tank. The air reservoir is configured to be fluidly connected to the isolation solenoid in such a way that the air reservoir receives the pressurized air from the vehicular air tank. The discharge nozzle is configured to be fluidly connected to the air reservoir. The discharge nozzle is also configured to (A) receive the pressurized air from the air reservoir, and (B) release and direct the pressurized air towards the exterior signal lamp of the vehicle. This is done in such a way that the pressurized air, which is released from the discharge nozzle, removes debris from the exterior signal lamp. The isolation solenoid is also configured to be electrically and fluidly isolated from the vehicular air tank of the vehicle during activation of the vehicular brake system of the vehicle (whereby the isolation solenoid does not adversely interfere with the operation of the vehicular air tank of the vehicle during the activation of the vehicular brake system).

To mitigate, at least in part, at least one problem associated with the existing technology, there is provided (in accordance with a major aspect) a vehicle that includes (and is not limited to) a synergistic combination of (A) an exterior signal lamp, (B) a vehicular stoplight circuit, (C) a vehicular brake system configured to brake the vehicle, (D) an air-operated braking system configured to operate the vehicular brake system, (E) a vehicular air tank configured to activate the air-operated braking system, and (F) a vehicular lamp cleaning system configured to remove, in use, accumulated debris from the exterior signal lamp. The vehicular lamp cleaning system includes (and is not limited to) a synergistic combination of an isolation solenoid, an air reservoir and a discharge nozzle. The isolation solenoid is configured to be fluidly connected to the vehicular air tank of the vehicle in such a way that the isolation solenoid receives pressurized air from the vehicular air tank. The air reservoir is configured to be fluidly connected to the isolation solenoid in such a way that the air reservoir receives the pressurized air from the vehicular air tank. The discharge nozzle is configured to be fluidly connected to the air reservoir. The discharge nozzle is also configured to (A) receive the pressurized air from the air reservoir, and (B) release and direct the pressurized air towards the exterior signal lamp of the vehicle. This is done in such a way that the pressurized air, which is released from the discharge nozzle, removes debris from the exterior signal lamp. The isolation solenoid is also configured to be electrically and fluidly isolated from the vehicular air tank of the vehicle during activation of the vehicular brake system of the vehicle (whereby the isolation solenoid does not adversely interfere with the operation of the vehicular air tank of the vehicle during the activation of the vehicular brake system).

Other aspects are identified in the claims.

Other aspects and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIG. 2 is installable thereto.

Figure 1:
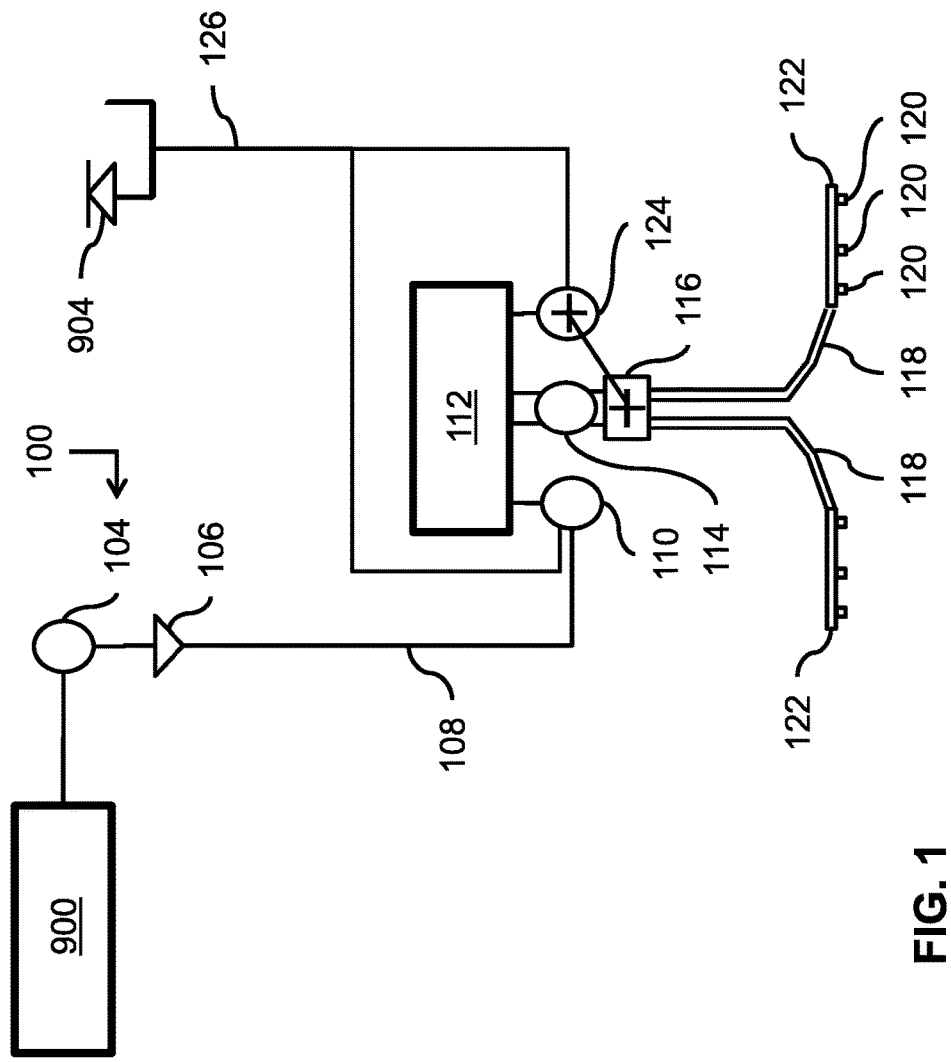
FIG. 1 depicts a schematic view of an embodiment of a vehicular lamp cleaning system.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS 100 vehicular lamp cleaning system
104 first protection valve
106 shut-off valve
108 first airline
110 isolation solenoid
112 air reservoir
114 second protection valve
116 distribution valve
118 second airline
120 discharge nozzles
122 distribution bars
124 pilot solenoid
126 electrical wires
200 first branch line
202 second branch line
900 vehicular air tank
902 vehicle
903 tractor unit
904 vehicular stoplight circuit
905 trailer unit
907 trailer-less truck
908 exterior signal lamp

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a." The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

FIG. 1 depicts a schematic view (that is, an electrical and mechanical schematic diagram) of a first embodiment of a vehicular lamp cleaning system 100.

Figure 3A:
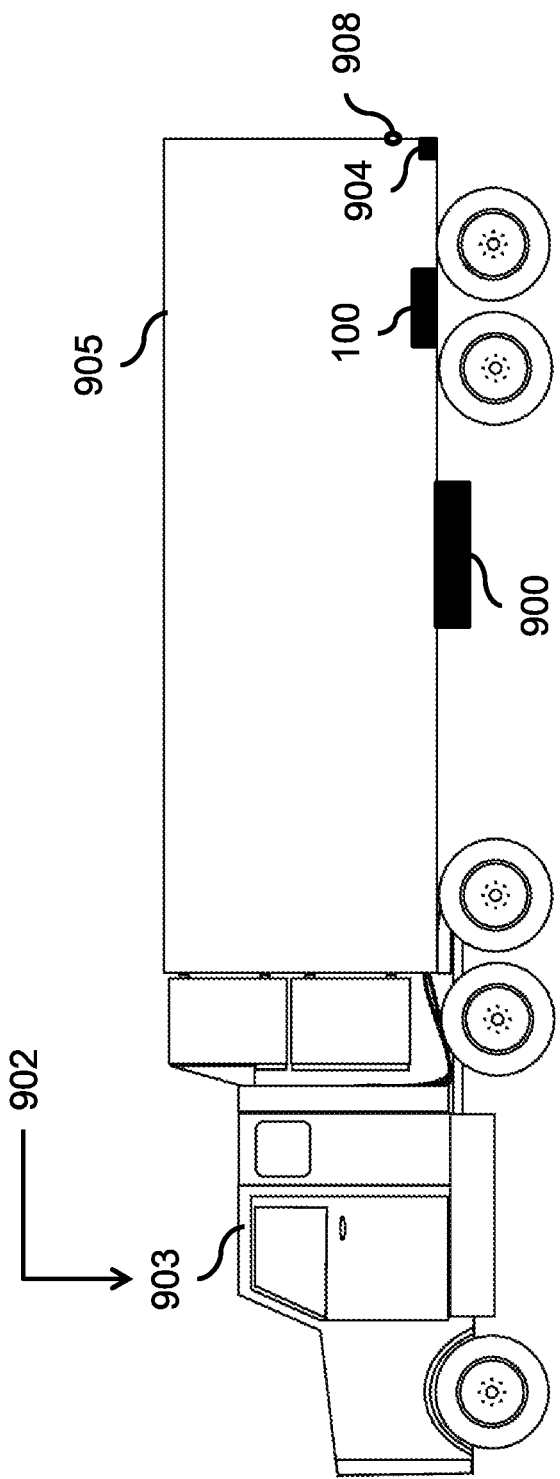
FIG. 3A and FIG. 3B depict a side view and a perspective view (respectively) of embodiments of a vehicle in which the vehicular lamp cleaning system of any one of FIG. 1
Figure 3B:
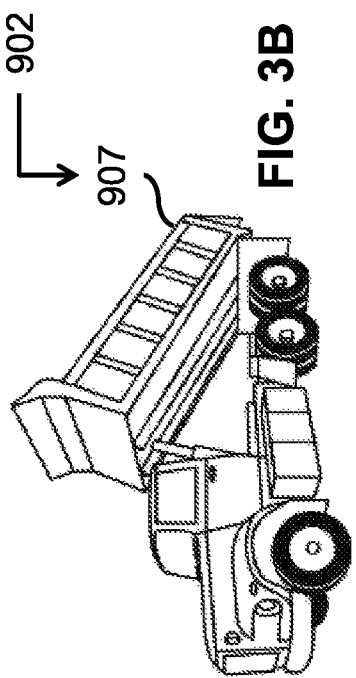

The vehicular lamp cleaning system 100 is configured to clean or remove, in use, accumulated debris (such as, snow and/or mud) from (off of) an exterior signal lamp (such as, an exterior brake signal lamp, a rear exterior brake signal lamp, a turn signal lamp, and/or a head lamp, etc., and any equivalent thereof) of a vehicle 902 (embodiments of the vehicle 902 are depicted in FIG. 3A and FIG. 3B). The vehicle 902 also includes (has) an air-operated braking system (which is known and not fully depicted) and is also called a vehicular brake system or a brake system. Preferably, the air-operated braking system is configured to brake the vehicle 902 (once the air-operated braking system receives pressurized air from the vehicular air tank 900). Embodiments of the vehicle 902 (as depicted in FIG. 3A and FIG. 3B) may include a commercial transport tractor and/or a trailer having an air-operated braking system, etc., and any equivalent thereof. Preferably, the vehicular lamp cleaning system 100 is configured to automatically clean (in use) and clear away debris from an exterior signal lamp of the vehicle 902 in response to activation of the air-operated braking system of the vehicle 902 (in which the air-operated braking system is configured to brake the vehicle 902). It will be appreciated that activation of the air-operated braking system may or may not include braking the movement of the vehicle 902. For instance, there are cases in which the activation of the air-operated braking system (performed for the case where the driver of the vehicle 902 lightly steps on the brake pedal as opposed to fully stepping on the brake pedal) causes the air-operated braking system to receive pressurized air from the vehicular air tank 900 but the brakes of the vehicle 902 are not engaged or not enabled but nevertheless the air is made to flow from the vehicular air tank 900 to the air-operated braking system. Of course, the typical operation includes the case where the driver of the vehicle 902 fully steps on the brake pedal and thereby causes the air-operated braking system to receive pressurized air from the vehicular air tank 900 in such a way that the brakes of the vehicle 902 become engaged or enabled.

Referring to FIG. 3A and FIG. 3B, it will be appreciated that the vehicle 902 may include a tractor unit (also called a prime mover or a traction unit) that is a heavy-duty towing engine that provides motive (movement) power for hauling a towed load or a trailered load.

Referring back to the embodiment as depicted in FIG. 1, the vehicular lamp cleaning system 100 is configured to remove, in use, accumulated debris positioned on the exterior signal lamp of the vehicle 902 in response to (for the case where) the driver of the vehicle 902 actuating the air-operated braking system (via depression of the brake petal of the vehicle 902). The technical effect of the vehicular lamp cleaning system 100 is that the vehicular lamp cleaning system 100 assists (in use) in maintaining the exterior signal lamps (such as the taillights) in a relatively visible condition (to other motorists), especially when the exterior-lamp visibility is needed most during adverse weather conditions while the vehicle 902 is moving (travelling). Preferably, the vehicular lamp cleaning system 100 is configured to be integrated into newly constructed instances of the vehicle 902 (during manufacture thereof). In accordance with a preferred option, the vehicular lamp cleaning system 100 is retrofitted to existing instances of the vehicle 902 currently in operation on the roadways. Generally, the vehicular lamp cleaning system 100 is configured to be installed on the vehicle 902 having an air-operated braking system.

More specifically, the vehicular lamp cleaning system 100 is configured to draw compressed (pressurized) air from the vehicular air tank 900 of the vehicle 902 (that is, from the air-braking system of the vehicle 902 depicted in FIG. 3A and FIG. 3B). This is done in such a way that the vehicular lamp cleaning system 100 does not adversely interfere with the normal operation of the air-braking system of the vehicle 902 once the vehicular lamp cleaning system 100 is activated in response to the activation of the brake system of the vehicle 902 (regardless of whether the driver activated the brake system via the brake pedal, or whether the vehicle computer activated the brake).

Once energized or activated, the vehicular lamp cleaning system 100 is configured to release an initial burst (pressurized discharge) of compressed air from an air reservoir 112 through distribution bars 122 and discharge nozzles 120 (as depicted in FIG. 1), in which the discharge nozzles 120 are positioned proximate to the exterior signal lamps. This is done in such a way that any accumulated debris (snow and/or mud) is blasted or forcibly removed, at least in part, away from the exterior surface of an exterior signal lamp (such as, the tail lamps, lenses, brake lamps, riding lamps, and any equivalent thereof, etc.). The vehicular lamp cleaning system 100 improves the cleanliness of the exterior surfaces of the exterior signal lamps of the vehicle 902 (thereby improving visibility of the vehicle 902, during adverse weather conditions, to trailing motorists). It will be appreciated that the distribution bars 122 and the discharge nozzles 120 are configured to be installed relative to any exterior signal lamp configuration.

The vehicular lamp cleaning system 100 is configured to use a relatively higher volume of pressurized air (preferably, without having to necessarily utilize a cleaning fluid) to clear debris away from the exterior signal lamps of the vehicle 902. This arrangement is for the case where visibility of the exterior signal lamps is needed the most (such as, during braking of the vehicle 902 while the vehicle 902 is driven during adverse weather conditions).

In accordance with an embodiment as depicted in FIG. 1, the vehicular lamp cleaning system 100 is configured to remove, in use, accumulated debris from an exterior signal lamp 908 of a vehicle 902 having a vehicular stoplight circuit 904. The vehicle 902 also has a vehicular air tank 900 for an air-operated braking system configured to operate a vehicular brake system. The vehicular brake system is configured to brake the vehicle 902. The vehicular lamp cleaning system 100 includes (and is not limited to) a synergistic combination of an isolation solenoid 110, an air reservoir 112 and a discharge nozzle 120. The isolation solenoid 110 is configured to be fluidly connected to the vehicular air tank 900 of the vehicle 902 (this is done in such a way that the isolation solenoid 110 receives pressurized air from the vehicular air tank 900). The air reservoir 112 is configured to be fluidly connected to the isolation solenoid 110 (this is done in such a way that the air reservoir 112 receives the pressurized air from the vehicular air tank 900). The discharge nozzle 120 is configured to be fluidly connected to the air reservoir 112. The discharge nozzle 120 is also configured to (A) receive the pressurized air from the air reservoir 112, and (B) release and direct the pressurized air towards the exterior signal lamp 908 of the vehicle 902. This is done in such a way that the pressurized air, which is released from the discharge nozzle 120, removes debris from the exterior signal lamp 908. The isolation solenoid 110 is also configured to be electrically and fluidly isolated from the vehicular air tank 900 of the vehicle 902 during activation of the vehicular brake system of the vehicle 902, whereby the isolation solenoid 110 does not adversely interfere with the operation of the vehicular air tank 900 of the vehicle 902 during the activation of the vehicular brake system.

In accordance with an embodiment as depicted in FIG. 1, FIG. 3A and FIG. 3B, the vehicle 902 includes (and is not limited to) a synergistic combination of (A) an exterior signal lamp 908, (B) a vehicular stoplight circuit 904, (C) a vehicular brake system configured to brake the vehicle 902, (D) an air-operated braking system configured to operate the vehicular brake system, (E) a vehicular air tank 900 configured to activate the air-operated braking system, and (F) a vehicular lamp cleaning system 100 configured to remove, in use, accumulated debris from the exterior signal lamp 908. The vehicular lamp cleaning system 100 includes (and is not limited to) a synergistic combination of an isolation solenoid 110, an air reservoir 112 and a discharge nozzle 120. The isolation solenoid 110 is configured to be fluidly connected to the vehicular air tank 900 of the vehicle 902 (this is done in such a way that the isolation solenoid 110 receives pressurized air from the vehicular air tank 900). The air reservoir 112 is configured to be fluidly connected to the isolation solenoid 110 (this is done in such a way that the air reservoir 112 receives the pressurized air from the vehicular air tank 900). The discharge nozzle 120 is configured to be fluidly connected to the air reservoir 112. The discharge nozzle 120 is also configured to (A) receive the pressurized air from the air reservoir 112, and (B) release and direct the pressurized air towards the exterior signal lamp 908 of the vehicle 902. This is done in such a way that the pressurized air, which is released from the discharge nozzle 120, removes debris from the exterior signal lamp 908. The isolation solenoid 110 is also configured to be electrically and fluidly isolated from the vehicular air tank 900 of the vehicle 902 during activation of the vehicular brake system of the vehicle 902 (whereby the isolation solenoid 110 does not adversely interfere with the operation of the vehicular air tank 900 of the vehicle 902 during the activation of the vehicular brake system).

In accordance with a specific embodiment as depicted in FIG. 1, the vehicular lamp cleaning system 100 includes a synergistic combination of a first protection valve 104, a shut-off valve 106, a first airline 108, an isolation solenoid 110, an air reservoir 112, a second protection valve 114, a distribution valve 116, a second airline 118, discharge nozzles 120, distribution bars 122, a pilot solenoid valve 124, and electrical wires 126.

The first protection valve 104 is configured to be fluidly connected to a vehicular air tank 900 of a vehicle 902 (as depicted in FIG. 3A and FIG. 3B). The shut-off valve 106 is configured to be fluidly connected to the first protection valve 104. The first airline 108 is configured to be fluidly connected to the shut-off valve 106. The isolation solenoid 110 is configured to be fluidly connected to the first airline 108. The air reservoir 112 is configured to be fluidly connected to the isolation solenoid 110. The second protection valve 114 is configured to be fluidly connected to the air reservoir 112. The distribution valve 116 is configured to be fluidly connected to the second protection valve 114. The second airline 118 is configured to be fluidly connected to the distribution valve 116.

In accordance with the embodiment as depicted in FIG. 1, there are, preferably, two instances of the second airline 118, one instance for each of the opposite lateral sides of the vehicle 902 (as depicted in FIG. 3A and FIG. 3B). The distribution bars 122 are configured to be fluidly connected to the second airline 118. The discharge nozzles 120 are configured to be fluidly connected to the distribution bars 122. The pilot solenoid valve 124 is configured to be fluidly connected to the air reservoir 112. The pilot solenoid valve 124 is configured to be ganged to the distribution valve 116. The electrical wires 126 are configured to electrically connect the isolation solenoid 110 and the pilot solenoid valve 124 to the vehicular stoplight circuit 904 of the vehicle 902 (as depicted in FIG. 3A and FIG. 3B).

In accordance with the embodiment as depicted in FIG. 1, the vehicular lamp cleaning system 100 includes the air reservoir 112 and a series of valves, and electric solenoids coupled to the distribution bar 122 (one or more instances of the distribution bar 122) with the discharge nozzle 120 (one or more instances of the discharge nozzle 120). Preferably, the air reservoir 112 has an internal volume of about 5.5 cubic feet, and is preferably rated at 120 PSI (pounds per square inch). Preferably, the air reservoir 112 is a certified compressed air storage tank. The distribution bars 122 and the discharge nozzles 120 are configured, in combination, to be arranged to sit with the exterior signal lamps (the exterior lighting configuration) of the vehicle 902 to which the vehicular lamp cleaning system 100 is to be installed thereto.

In accordance with the embodiment as depicted in FIG. 1, the vehicular lamp cleaning system 100 includes a safety feature configured to improve the performance of the vehicular lamp cleaning system 100 while not interfering with (or impeding) the existing braking system (or any system) of the vehicle 902.

In accordance with an optional embodiment, the safety feature (of the vehicular lamp cleaning system 100) includes the first protection valve 104. The first protection valve 104 is configured to prevent the vehicular lamp cleaning system 100 from receiving air from the vehicular air tank 900 of the vehicle 902 for the case where the operating pressure of the vehicular air tank 900, in use, drops below a predetermined threshold level, such as, 85 PSI (pounds per square inch).

In accordance with yet another optional embodiment, the safety feature (of the vehicular lamp cleaning system 100) includes the isolation solenoid 110. The isolation solenoid 110 is preferably configured to be normally open. The isolation solenoid 110 is also called an electronic isolation solenoid. The isolation solenoid 110 is configured to isolate the vehicular lamp cleaning system 100 from the vehicular air tank 900 (that is, the air system of the vehicle 902) for the case where the vehicular lamp cleaning system 100 is energized during user application (actuation) of the braking system of the vehicle 902. The isolation solenoid 110 is configured to be mounted, specifically, to an inlet port of the air reservoir 112. The isolation solenoid 110 is configured to be connected to the vehicular stoplight circuit 904, and is configured to be energized at the same time as the pilot solenoid valve 124. The isolation solenoid 110 is configured to close off airflow from the vehicular air tank 900 to the air reservoir 112 for the case where the air-operated braking system has been activated (by the driver). The isolation solenoid 110 is also configured to close and not allow the air reservoir 112 to accept air from the vehicular air tank 900 for the case where (A) the vehicular air tank 900 has an internal pressure that is above a predetermined threshold level (such as, about 85 PSI), and (B) the user has actuated the brakes of the vehicle 902. The isolation solenoid 110 is configured to ensure that a relatively small insignificant amount of air is drawn from the vehicular air tank 900 during braking of the vehicle 902 (preferably no air is drawn but there is always an amount of acceptable leakage in any fluid system). The technical effect of the isolation solenoid 110 is to ensure, at least in part, that the vehicular lamp cleaning system 100 does not adversely interfere with the air supply (from the vehicular air tank 900) to the vehicular braking system during brake application.

In accordance with yet another optional embodiment, the safety feature (of the vehicular lamp cleaning system 100) includes the first protection valve 104. The first protection valve 104 is configured to be installed on a spare outlet port of the vehicular air tank 900. The first protection valve 104 is configured to automatically close for the case where the interior pressure of the vehicular air tank 900 of the vehicle 902 falls below a threshold level (such has, 85 PSI), to thereby cut off air supply to the air reservoir 112 of the vehicular lamp cleaning system 100.

In accordance with yet another optional embodiment, the safety feature (of the vehicular lamp cleaning system 100) includes the shut-off valve 106. The shut-off valve 106 is also called the manual air shut-off valve. The shut-off valve 106 is installed on the output port of the first protection valve 104. The shut-off valve 106 is configured to manually close and isolate the vehicular lamp cleaning system 100 from the vehicular air tank 900 of the vehicle 902 for the case where the vehicular lamp cleaning system 100 needs to be maintained or has failed (to turn the vehicular lamp cleaning system 100 off).

In accordance with yet another optional embodiment, the safety feature (of the vehicular lamp cleaning system 100) includes the first airline 108 having a relatively smaller diameter air-supply line. This arrangement allows the vehicular air tank 900 of the vehicle 902 to become recharged faster than the air reservoir 112 can be recharged. A technical effect of the first airline 108 is the reduction of adverse impact on the operation of the vehicular air tank 900 of the vehicle 902 during relatively higher usage of the vehicular air tank 900 (for operating the braking system of the vehicle 902). Preferably, the first airline 108 has an outer diameter of about 0.25 inches. The first airline 108 may be called a DOT approved airline. DOT stands for Department of Transport. The first airline 108 is configured to connect the shut-off valve 106 to the isolation solenoid 110. The first airline 108 is configured to supply air from the vehicular air tank 900 to the isolation solenoid 110.

In accordance with yet another optional embodiment, the safety feature (of the vehicular lamp cleaning system 100) includes the second protection valve 114. The second protection valve 114 is fluidly connected to a discharge port of the air reservoir 112. The second protection valve 114 is configured to cut off, in use, airflow to the distribution valve 116 at a predetermined threshold level (such as, at 45 PSI). The technical effect of the second protection valve 114 is the reduction of demand on the vehicular air tank 900 of the vehicle 902 with relatively little reduction in effective cleaning force (delivered air pressure) to be applied to the exterior signal lamps of the vehicle 902. For the case where the air reservoir 112 reaches the threshold level (45 PSI) during discharge, the second protection valve 114 is configured to close. This is done in such a way that the volume of compressed air demand on the vehicular air tank 900 is reduced (at least in part). The lower pressure may serve no advantage to the cleaning process (removing debris from the exterior signal lamps of the vehicle 902).

In accordance with yet another optional embodiment, the safety feature (of the vehicular lamp cleaning system 100) includes the distribution valve 116. The distribution valve 116 is configured to release (when opened by pilot pressure from the pilot solenoid valve 124) a relatively higher volume of compressed air from the air reservoir 112 through the second airline 118 (distribution airline) to the distribution bars 122.

Preferably, the second airline 118 includes a DOT airline having an outer diameter of about ⅝ inches (and may include a plastic airline). The second airline 118 is configured to carry compressed air from the second protection valve 114 to the distribution bars 122.

Preferably, the discharge nozzles 120 provide (define) a nominal 0.25 inch diameter outlet. The discharge nozzles 120 are configured to release a relatively higher pressure of air, and to direct the same towards the exterior signal lamps of the vehicle 902 (once positioned to do just so). The discharge nozzles 120 are configured to be aimed at approximately 45 degrees to the exterior surface of the exterior signal lamp (lens) in such a way as to maximize the air dispersion and coverage area of the exterior signal lamp. The composition of the discharge nozzles 120 may vary to tailor the durability to the requirements and conditions.

The distribution bars 122 are configured to have a length configured to match the exterior signal lamp configuration of the vehicle 902. The distribution bars 122 include pressure-rated materials to which the discharge nozzles 120 are operatively connected thereto.

In accordance with yet another optional embodiment, the safety feature (of the vehicular lamp cleaning system 100) includes the pilot solenoid valve 124. The pilot solenoid valve 124 is configured to be normally closed. The pilot solenoid valve 124 is configured to be mounted to a port on the air reservoir 112. The pilot solenoid valve 124 is configured to be electrically opened to send pilot air control to the distribution valve 116. The pilot solenoid valve 124 is electrically connected to the vehicular stoplight circuit 904 of the vehicle 902. Preferably, the pilot solenoid valve 124 is configured to be energized when an exterior stop lamp of the vehicle 902 is activated. The pilot solenoid valve 124 is configured to be energized when the exterior stop lamps (of the vehicle 902) are activated. The pilot solenoid valve 124, when energized, is configured to send a burst of air pressure to the pilot port of the distribution valve 116 (this arrangement thereby urges the distribution valve 116 to open and the distribution valve 116 may release a relatively higher volume of compressed air to the distribution bars 122, etc.).

In accordance with yet another optional embodiment, the safety feature (of the vehicular lamp cleaning system 100) is configured to accommodate the case where the driver of the vehicle 902 desires to clear off the lights while driving the vehicle 902. For this case, the driver of the vehicle 902 simply depresses the brake pedal temporarily (occasionally and lightly) with sufficient brake-pedal activation force applied to the brake pedal of the vehicle 902 (so that the brakes do not become engaged but rather remain unengaged). This is done in such a way that a brake light switch (of the vehicle 902) is activated without sufficient force to activate (engage) the brakes (air-operated brakes) of the vehicle 902 but with just enough force to activate the vehicular lamp cleaning system 100 and result in the desired cleaning of the exterior signal lamp of the vehicle 902.

It will be appreciated that the components of the vehicular lamp cleaning system 100 are configured to take pressurized air in a relatively slow manner from the vehicular air tank 900.

In accordance with a preferred embodiment, the vehicular lamp cleaning system 100 is not electrically timed, and works in conjunction with a brake light circuit so it ensures lights are clean when they are needed the most.

In accordance with a preferred embodiment, the vehicular lamp cleaning system 100 is configured to be controlled by the driver in response to the driver depressing the brake pedal with sufficient force to trigger the brake light switch to energize the vehicular lamp cleaning system 100.

Preferably, the vehicular lamp cleaning system 100 does not rely on the clearance light circuit to be energized by the driver of the vehicle 902. More preferably, the vehicular lamp cleaning system 100 is configured to not adversely interfere with the air brake system of the vehicle 902, and the vehicular lamp cleaning system 100 is also configured to become isolated (electrically and fluidly) from the air brake system of the vehicle 902 during braking applications of the vehicle 902. Even more preferably, the vehicular lamp cleaning system 100 is configured to ensure that the vehicular air tank 900 is resupplied faster than the air reservoir 112 can draw air from the vehicular air tank 900.

Figure 2:
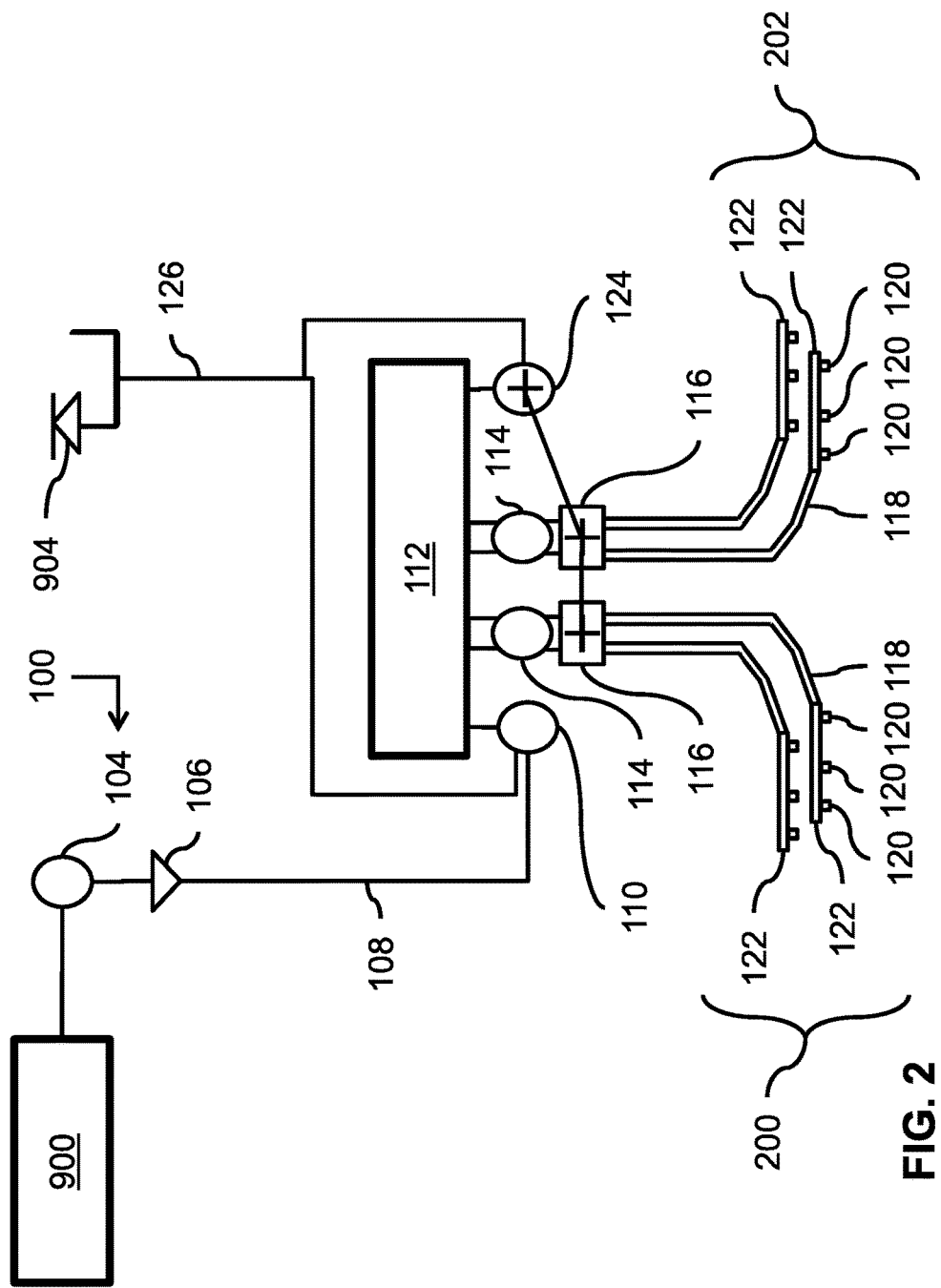
FIG. 2 depicts a schematic view of another embodiment of the vehicular lamp cleaning system of FIG. 1.

FIG. 2 depicts a schematic view (an electrical and mechanical schematic diagram) of an embodiment of the vehicular lamp cleaning system 100 of FIG. 1.

The vehicular lamp cleaning system 100 depicted in FIG. 2 is similar in function to the embodiment depicted in FIG. 1. In accordance with the embodiment depicted in FIG. 2, the vehicular lamp cleaning system 100 includes a first branch line 200 and a second branch line 202 that is spaced apart from the first branch line 200. The first branch line 200 and the second branch line 202 are for each of the opposite lateral sides of the vehicle 902 (as depicted in FIG. 3A and FIG. 3B). Each of the first branch line 200 and the second branch line 202 include the second protection valve 114 and the distribution valve 116. The pilot solenoid valve 124 is configured to be ganged with the instances of the distribution valve 116. Each of the first branch line 200 and the second branch line 202 include two instances of the second airline 118 and two instances of the distribution bars 122.

FIG. 3A and FIG. 3B depict a side view and a perspective view (respectively) of embodiments of a vehicle 902 in which the vehicular lamp cleaning system 100 of any one of FIG. 1 and FIG. 2 is installable thereto.

In accordance with the embodiment (as depicted in FIG. 3A and FIG. 3B), the vehicle 902 includes a tractor unit 903 (also called a prime mover or a traction unit) that is a heavy-duty towing engine configured to selectively connect to a trailer unit 905, and to haul (in use) the trailer unit 905 (once connected). The trailer unit 905 is also called a towed load or a trailered load. The vehicular lamp cleaning system 100 is mounted to the trailer unit 905. The vehicular stoplight circuit 904 is mounted to the rear section of the trailer unit 905. The vehicular air tank 900 is mounted to a lower exterior area of the trailer unit 905. The air-operated braking system of the vehicle 902, as depicted, is configured to be mounted to the trailer unit 905. It will be appreciated that the vehicle 902 includes (in accordance with an embodiment) a trailer-less truck 907.

The vehicular air tank 900 is operatively installed in (to) the vehicle 902. The vehicular stoplight circuit 904 is operatively installed in the vehicle 902.

In accordance with the embodiment depicted in FIG. 2, the vehicle 902 includes a synergistic combination of the vehicular air tank 900, the vehicular stoplight circuit 904 and the vehicular lamp cleaning system 100 of any one of FIG. 1 and FIG. 2.

The vehicular air tank 900 may be called an OEM air tank (OEM stands for original equipment manufacturer). The vehicular air tank 900 is equipment already existing on the vehicle 902.

In accordance with a preferred embodiment, the vehicular lamp cleaning system 100 does not use a timer for timed controlled cleaning of the lights (lamps) of the vehicle 902; this may be an advantage for the driver of the vehicle 902 in that the driver (user) has one less issue to deal with when operating the vehicle.

In accordance with a preferred embodiment, the isolation solenoid 110 (also called an isolation solenoid valve) is installed in the vehicular lamp cleaning system 100. The isolation solenoid 110 is configured to (in use) electrically isolate the air system of the vehicle 902 and the vehicular lamp cleaning system 100. In this manner, the vehicular lamp cleaning system 100 cannot be deployed (used) in the brake operations associated with the vehicle 902.

In accordance with a preferred embodiment, the vehicular lamp cleaning system 100 operates during the operation of the brakes of the vehicle 902. In this manner, there is no operational interference between the operation of the brakes of the vehicle 902 and the operation of the vehicular lamp cleaning system 100 (for cleaning of the lights or lamps of the vehicle 902). The vehicular lamp cleaning system 100 and the brakes of the vehicle 902 operate independently relative to each other.

It will be appreciated that the description identifies and describes options and variations of the vehicular lamp cleaning system 100, regardless of whether the description identifies the options and/or variations of the vehicular lamp cleaning system 100 by way of explicit terms and/or non-explicit terms. Other options for the vehicular lamp cleaning system 100 as identified in this paragraph may include any combination and/or permutation of the technical features (assemblies, components, items, devices, etc.) as identified in the detailed description, as may be required and/or desired to suit a particular technical purpose and/or technical function. It will be appreciated that, where possible, any one or more of the technical features and/or any one or more sections of the technical features of the vehicular lamp cleaning system 100 may be combined with any other one or more of the technical features and/or any other one or more sections of the technical features of the vehicular lamp cleaning system 100 in any combination and/or permutation. Any one or more of the technical features and/or any one or more sections of the technical features of the vehicular lamp cleaning system 100 may stand on its own merit without having to be combined with another technical feature. It will be appreciated that persons skilled in the art would know that technical features of each embodiment may be deployed (where possible) in other embodiments even if not expressly stated as such above. It will be appreciated that persons skilled in the art would know that other options would be possible for the configuration of the components of the vehicular lamp cleaning system 100 (if so desired) to adjust to manufacturing requirements and still remain within the scope of the invention as described in at least one or more of the claims. This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims. It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. A vehicular lamp cleaning system configured to remove, in use, accumulated debris from an exterior signal lamp of a vehicle having a vehicular stoplight circuit, and the vehicle also having a vehicular air tank for an air-operated braking system configured to operate a vehicular brake system configured to brake the vehicle, the vehicular lamp cleaning system comprising:
    an isolation solenoid for fluid connection to the vehicular air tank of the vehicle in such a way that the isolation solenoid receives, in use, pressurized air from the vehicular air tank; and
    an air reservoir for fluid connection to the isolation solenoid in such a way that the air reservoir receives, in use, the pressurized air from the vehicular air tank; and
    a discharge nozzle for fluid connection to the air reservoir, and the discharge nozzle receiving, in use, the pressurized air from the air reservoir, and releasing, in use, and directing, in use, the pressurized air towards the exterior signal lamp of the vehicle in such a way that the pressurized air, which is released from the discharge nozzle, removes debris from the exterior signal lamp of the vehicle; and
    wherein the isolation solenoid is electrically isolated from the vehicular air tank of the vehicle during activation of the vehicular brake system of the vehicle, whereby the isolation solenoid does not adversely interfere with operation of the vehicular air tank of the vehicle during the activation of the vehicular brake system.

2. The vehicular lamp cleaning system of claim 1, further comprising:
    a first protection valve fluidly connected to the vehicular air tank of the vehicle;
    a shut-off valve fluidly connected to the first protection valve;
    a first airline fluidly connected to the shut-off valve;
    wherein the isolation solenoid is fluidly connected to the first airline.

3. The vehicular lamp cleaning system of claim 2, further comprising:
    a second protection valve fluidly connected to the air reservoir;
    a distribution valve fluidly connected to the second protection valve;
    a second airline fluidly connected to the distribution valve; and
    a distribution bar fluidly connected to the second airline; and
    wherein the discharge nozzle is fluidly connected to the distribution bar.

4. The vehicular lamp cleaning system of claim 3, further comprising:
    a pilot solenoid valve fluidly connected to the air reservoir; and
    the pilot solenoid valve being ganged to the distribution valve; and
    electrical wires electrically connecting the isolation solenoid and the pilot solenoid valve to the vehicular stoplight circuit of the vehicle.

5. The vehicular lamp cleaning system of claim 3, wherein:
    the first protection valve prevents, in use, the isolation solenoid from receiving the pressurized air from the vehicular air tank once an operating pressure of the vehicular air tank, in use, drops below a predetermined threshold level.

6. The vehicular lamp cleaning system of claim 1, wherein:
    the isolation solenoid is configured to become fluidly isolated from the vehicular air tank once the air-operated braking system of the vehicle is activated to brake the vehicle.

7. The vehicular lamp cleaning system of claim 4, wherein:
    the isolation solenoid connects to the vehicular stoplight circuit, and is energized at the same time as the pilot solenoid valve.

8. The vehicular lamp cleaning system of claim 1, wherein:
    the isolation solenoid closes off airflow from the vehicular air tank to the air reservoir in response to the activation of the air-operated braking system of the vehicle.

9. The vehicular lamp cleaning system of claim 1, wherein:
    the isolation solenoid prevents the air reservoir from receiving the pressurized air from the vehicular air tank in response to (A) the vehicular air tank having an internal pressure that is above a predetermined threshold level, and (B) the vehicular brake system of the vehicle is actuated.

10. The vehicular lamp cleaning system of claim 1, wherein:

the isolation solenoid ensures that a relatively small insignificant amount of air is drawn from the vehicular air tank during braking of the vehicle.

11. The vehicular lamp cleaning system of claim 1, wherein:
the isolation solenoid ensures, at least in part, that the vehicular lamp cleaning system does not adversely interfere with the vehicular air tank used for braking of the vehicle.

12. The vehicular lamp cleaning system of claim 3, wherein:
the first protection valve closes in response to an interior pressure of the vehicular air tank reducing to below a threshold level in such a way that the first protection valve prevents intake of the pressurized air to the air reservoir.

13. The vehicular lamp cleaning system of claim 2, wherein:
the shut-off valve manually closes and isolates the isolation solenoid from the vehicular air tank.

14. The vehicular lamp cleaning system of claim 3, wherein:
the second protection valve cuts off, in use, air flow to the distribution valve at a predetermined threshold level; and
the second protection valve, in use, reduces demand on the vehicular air tank of the vehicle.

15. The vehicular lamp cleaning system of claim 14, wherein:
the second protection valve closes in response to the air reservoir reaching a threshold level during discharge in such a way that a volume of compressed air demand on the vehicular air tank is reduced, at least in part.

16. The vehicular lamp cleaning system of claim 4, wherein:
the distribution valve releases, when opened by pilot pressure from the pilot solenoid valve, a relatively higher volume of compressed air from the air reservoir to the distribution bar.

17. The vehicular lamp cleaning system of claim 4, wherein:
the pilot solenoid valve is normally closed; and
the pilot solenoid valve is electrically openable to send pilot air control to the distribution valve; and
the pilot solenoid valve is electrically connected to the vehicular stoplight circuit of the vehicle; and
the pilot solenoid valve is energized when an exterior stop lamp of the vehicle is activated; and
the pilot solenoid valve, when energized, sends a burst of air pressure to the distribution valve to thereby urge the distribution valve to open and the distribution valve may release a relatively higher volume of compressed air to the distribution bar.

18. The vehicular lamp cleaning system of claim 3, wherein:
the isolation solenoid is activated in such a way that the pressurized air, in use, flows from the discharge nozzle to remove the accumulated debris from the exterior signal lamp of the vehicle in response to application of a brake-pedal activation force that is sufficient enough to activate a brake light switch of the vehicle but without activating the air-operated braking system of the vehicle.

19. The vehicular lamp cleaning system of claim 2, wherein:
the vehicular lamp cleaning system is not electrically timed, and works in conjunction with a brake light circuit so it ensures lights are clean when they are needed the most.

20. The vehicular lamp cleaning system of claim 1, wherein:
the isolation solenoid ensures that the vehicular air tank is resupplied faster than the air reservoir can draw air from the vehicular air tank.

21. A vehicle, comprising:
an exterior signal lamp; and
a vehicular stoplight circuit; and
a vehicular brake system configured to brake the vehicle; and
an air-operated braking system configured to operate the vehicular brake system; and
a vehicular air tank configured to activate the air-operated braking system; and
a vehicular lamp cleaning system configured to remove, in use, accumulated debris from the exterior signal lamp, and the vehicular lamp cleaning system including:
an isolation solenoid fluidly connected to the vehicular air tank of the vehicle in such a way that the isolation solenoid receives, in use, pressurized air from the vehicular air tank; and
an air reservoir fluidly connected to the isolation solenoid in such a way that the air reservoir receives, in use, the pressurized air from the vehicular air tank; and
a discharge nozzle fluidly connected to the air reservoir, and the discharge nozzle receiving, in use, the pressurized air from the air reservoir, and releasing, in use, and directing, in use, the pressurized air towards the exterior signal lamp of the vehicle in such a way that the pressurized air, which is released from the discharge nozzle, removes debris from the exterior signal lamp; and
wherein the isolation solenoid is also electrically isolated from the vehicular air tank of the vehicle during activation of the vehicular brake system of the vehicle, whereby the isolation solenoid does not adversely interfere with operation of the vehicular air tank of the vehicle during the activation of the vehicular brake system.

* * * * *